Feb. 13, 1940.  W. E. NAYLOR  2,190,457
FLASK FILLING APPARATUS
Filed Jan. 28, 1937  4 Sheets-Sheet 1
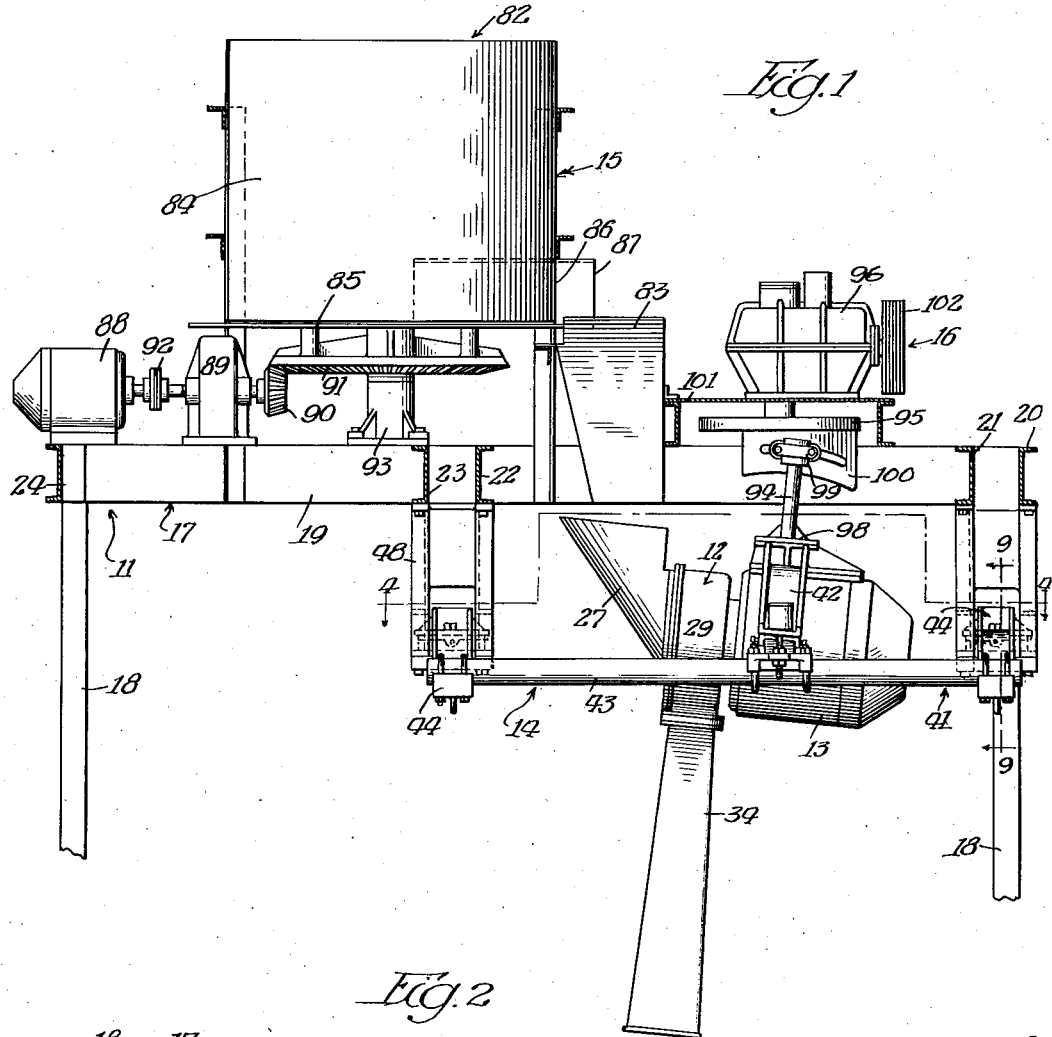
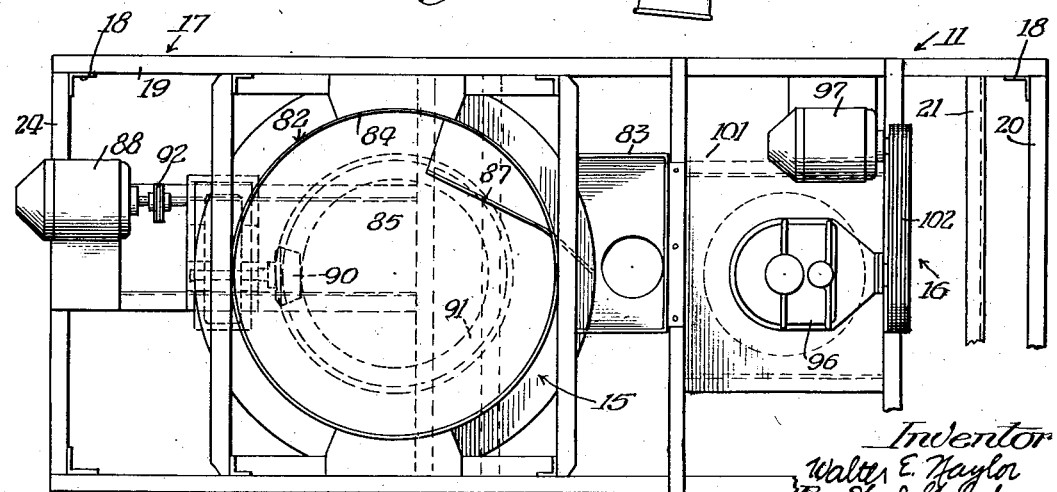

Feb. 13, 1940.    W. E. NAYLOR    2,190,457
FLASK FILLING APPARATUS
Filed Jan. 28, 1937    4 Sheets-Sheet 2
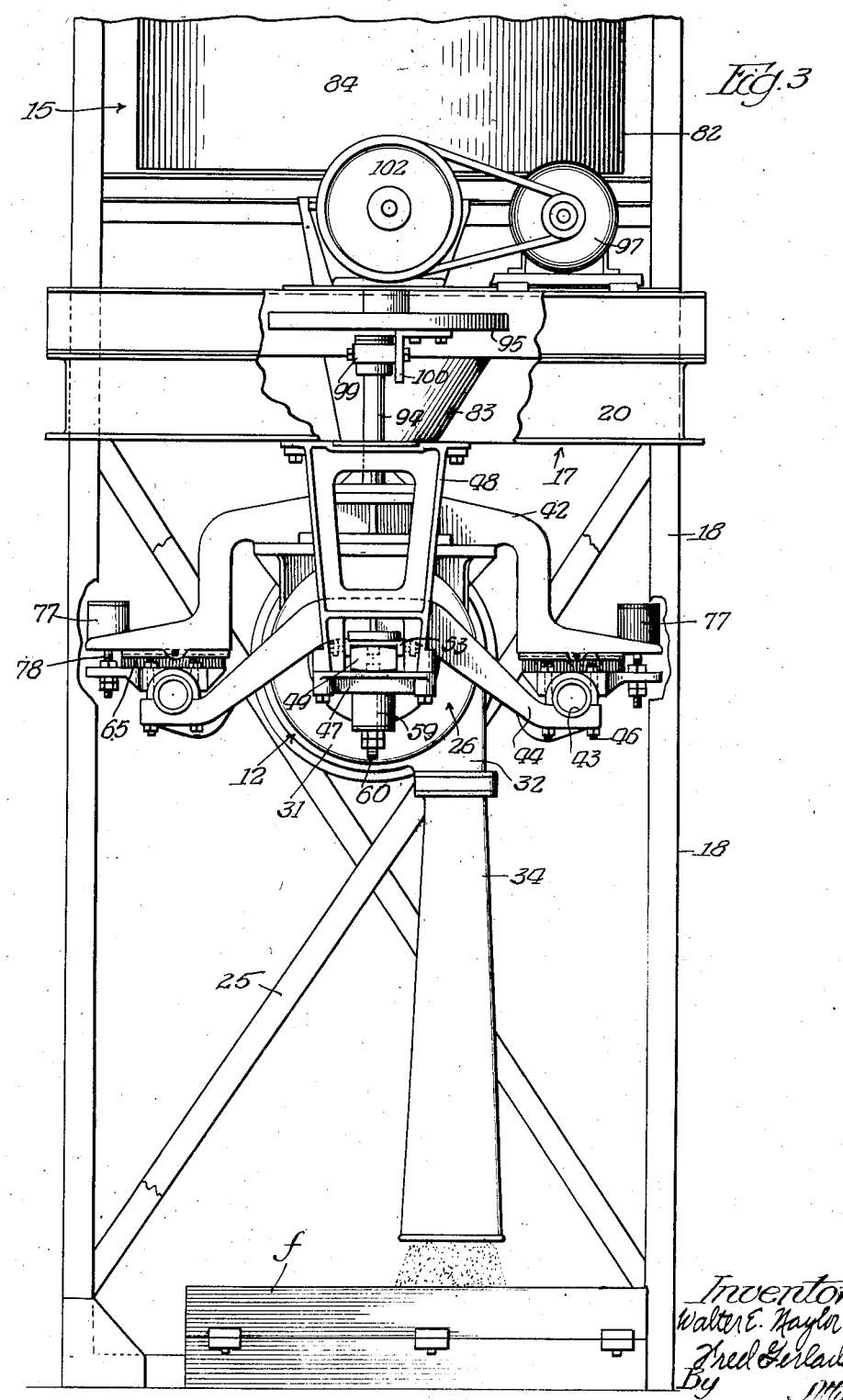

Feb. 13, 1940.  W. E. NAYLOR  2,190,457
FLASK FILLING APPARATUS
Filed Jan. 28, 1937   4 Sheets-Sheet 3
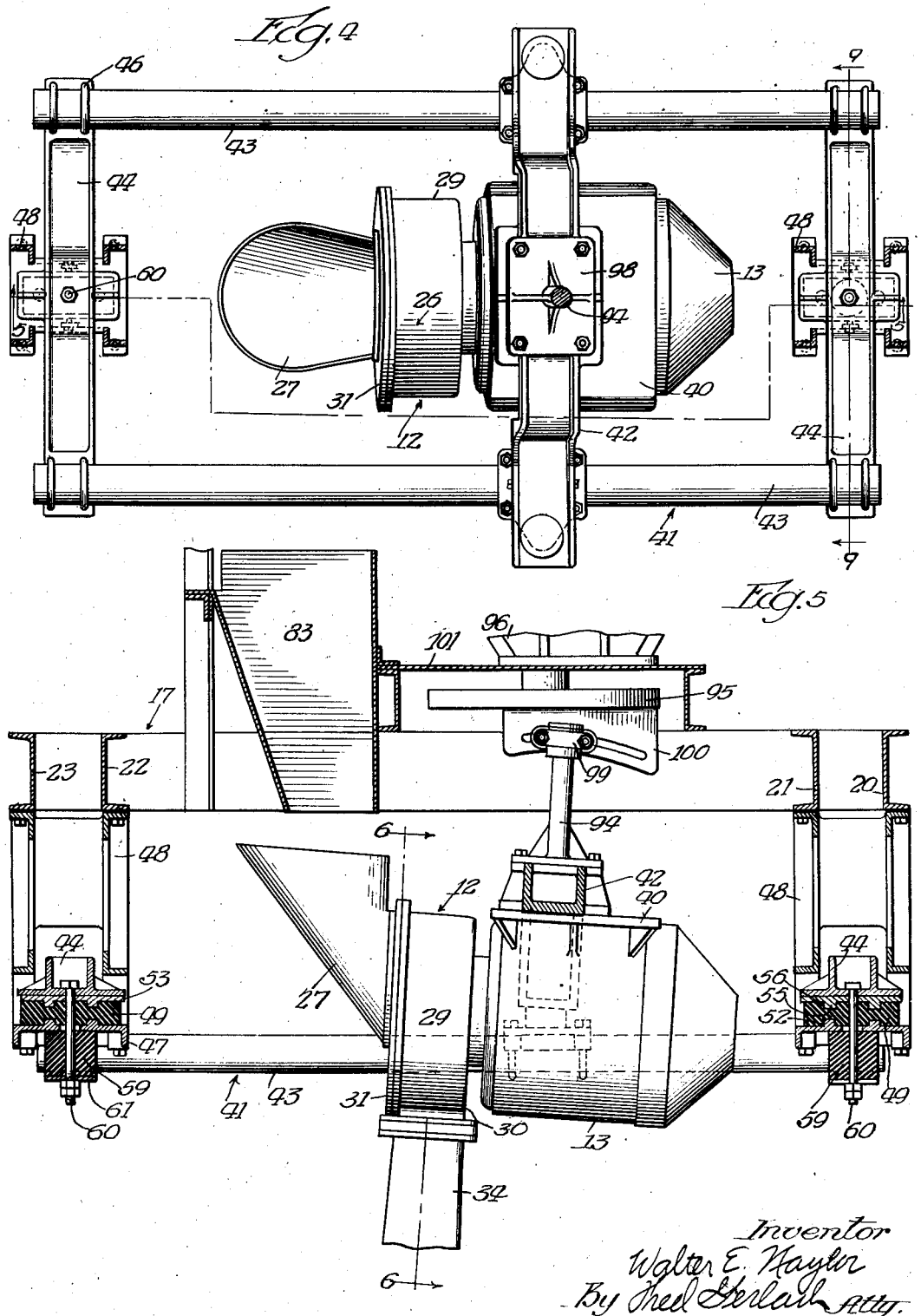

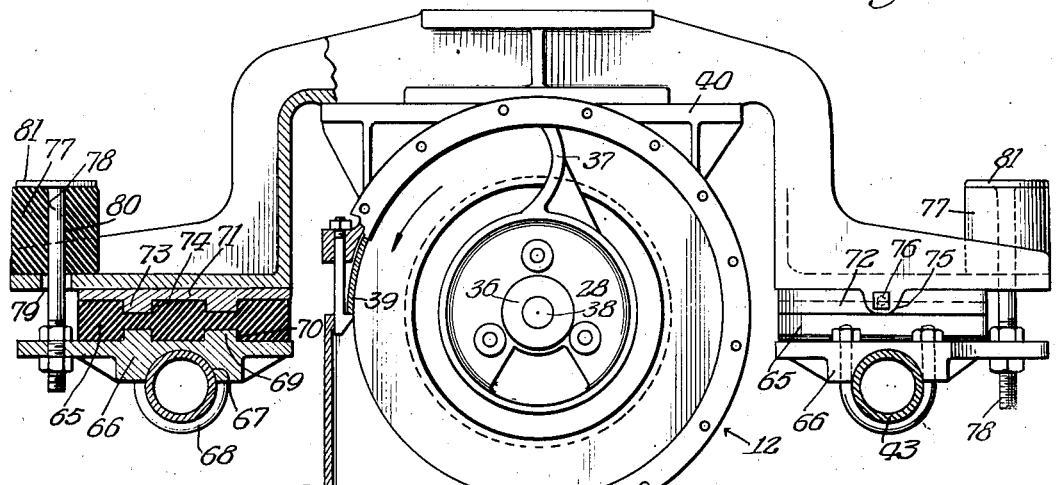
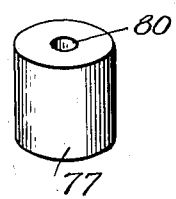
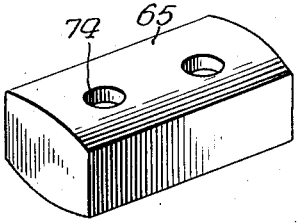
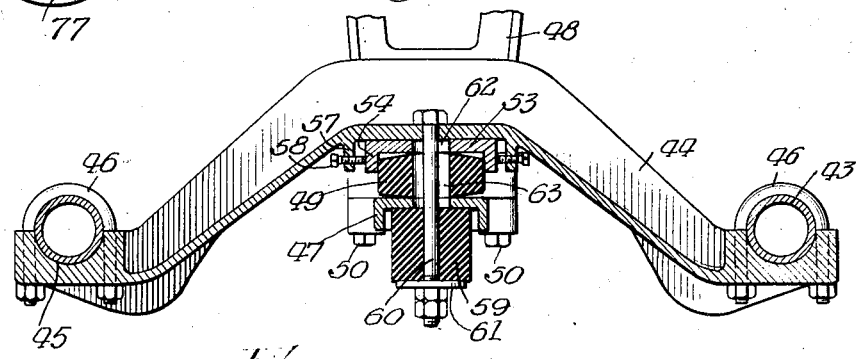
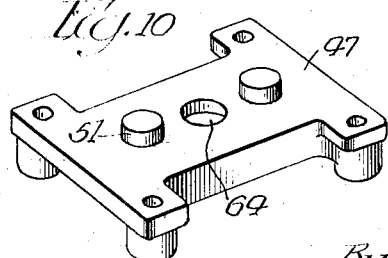

Patented Feb. 13, 1940

2,190,457

UNITED STATES PATENT OFFICE 2,190,457

FLASK FILLING APPARATUS

Walter E. Naylor, Chicago, Ill., assignor to The Beardsley & Piper Company, Chicago, Ill., a corporation of Illinois Application January 28, 1937, Serial No. 122,700

10 Claims. (Cl. 22—36)

The present invention relates generally to apparatus for filling flasks with moulding sand. More particularly the invention relates to that type of apparatus which is designed for use in a foundry or like establishment and comprises as the main parts thereof (1) a frame-like supporting structure; (2) an assembly in the form of a rotary projector and an electric motor for driving the projector and causing it to form wads of sand and project the latter downwardly into a subjacent flask; and (3) a mounting whereby the assembly of projector and motor is suspended from the supporting structure so that it is universally movable to a limited extent and the projector may hence be controlled or manipulated so as to cause it to fill all portions of the flask with the wads of sand.

One object of the invention is to provide a flask-filling apparatus of this type in which the mounting whereby the assembly of projector and motor is suspended from the supporting structure for limited universal movement is of novel design and is an improvement upon and has certain advantages over that which is disclosed in United States Letters Patent No. 2,092,328, granted to Walter F. Piper and me on September 7, 1937.

Another object of the invention is to provide a flask filling apparatus of the type and character under consideration in which the mounting for the assembly of rotary projector and motor comprises a rectangular frame which extends around the assembly and is pivoted at the ends thereof so that the assembly may be rocked laterally, and also comprises a yoke which extends around and is secured to the motor and has its ends resting on and pivotally connected to the central portion of the side members of the frame so that the assembly may be tilted vertically into different angular positions.

A further object of the invention is to provide a flask-filling apparatus which is generally of new and improved construction and is of such design and character that it is exceptionally rugged and effectively and efficiently fulfills its intended purpose.

Other objects of the invention and the various advantages and characteristics of the present flask filling apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a view partly in vertical longitudinal section and partly in side elevation of a flask filling apparatus embodying the invention;

Figure 2 is a fragmentary plan view;

Figure 3 is an end elevation, parts being broken away for purposes of illustration;

Figure 4 is an enlarged horizontal sectional view taken on the line 4—4 of Figure 1 and showing in detail the design and construction of the frame and yoke which constitute the mounting whereby the assembly of projector and motor is supported for limited universal movement;

Figure 5 is a vertical transverse section taken on the line 5—5 of Figure 4 and showing in detail the construction and arrangement of the rubber blocks which constitute the pivotal connections at the ends of the frame;

Figure 6 is an enlarged vertical section taken on the line 6—6 of Figure 5 and illustrating the internal construction and the arrangement of the parts of the motor driven rotary projector and also the construction and design of the rubber blocks which constitute the pivotal connections between the ends of the yoke and the side members of the frame;

Figure 7 is a perspective of one of the rubber blocks which is shown in Figure 6;

Figure 8 is a perspective of one of the rubber cylinders which constitute snubbers at the ends of the yoke;

Figure 9 is an enlarged transverse section on the line 9—9 of Figure 1; and

Figure 10 is a perspective of one of the base plates on which are supported the rubber blocks constituting the pivotal connections at the ends of the frame.

The apparatus which is shown in the drawings constitutes the preferred form of the invention. It is adapted for use in a foundry or like establishment, operates as hereinafter described to fill a subjacent flask *f* with properly treated or prepared sand or like mould-forming material and comprises as the main parts thereof a supporting structure 11, a wad forming and slinging assembly in the form of a rotary projector 12 and an electric motor 13, a mounting 14 for suspending the assembly from the supporting structure so that it is universally movable to a limited extent, mechanism 15 for supplying moulding sand into the projector for wad forming purposes, and a mechanism 16 for automatically moving the assembly so as to cause the projector to fill all portions of the flask *f* with wads of sand.

The supporting structure 11 constitutes a support for the sand supplying mechanism 15 and the automatic assembly moving mechanism 16 and consists of a platform forming frame 17 and a plurality of legs 18 for supporting the frame in an elevated position over the floor of the foundry or establishment in which the apparatus is employed. The frame 17 is rectangular and consists of a pair of laterally spaced parallel side beams 19 and a plurality of cross-beams 20, 21, 22, 23 and 24. The cross-beams are channel shaped in cross-section and extend between and serve to space apart the side beams 19 which, as illustrated in the drawings, are of the same cross-sectional design as the cross-beams. The cross-beams 20 and 21 are located at one end of the frame 17 of the supporting structure and are positioned in a vertical manner and opposed relation. The cross-beams 22 and 23 are centrally positioned as far as the frame is concerned and extend vertically and in laterally spaced relation. The cross-beam 24 is located at the other end of the frame 17 and is suitably secured to the adjacent ends of the side beams 19. The legs 18 are suitably secured at their upper ends to the corners of the frame 17 and are cross-braced adjacent to the ends of the supporting structure by diagonally extending bars 25. The frame 17 of the supporting structure is supported by the legs 18 at such an elevation or height that the flask *f* may be readily moved beneath it into a position beneath the projector 12.

The projector 12 is of the rotary variety and corresponds in design and operation to that which forms the subject matter of United States Letters Patent No. 2,092,329 granted to the aforesaid Walter F. Piper, on September 7, 1937. It operates to form wads of the moulding sand or material and to sling the wads downwards in rapid succession into the flask *f*, and comprises a casing 26, a hopper 27 for delivering sand from the sand supporting mechanism 18 into the casing, and a rotor 28. The casing 26 is substantially cylindrical and embodies an annular wall 29 and a pair of circular or disk-like walls 30 and 31. The annular wall 29 is positioned so that the axis thereof extends substantially horizontally and has a downwardly extending tangentially arranged discharge member 32. The latter constitutes an outlet for the casing of the projector and is connected by bolts 33 to the upper end of a vertically extending wad directing tube 34. The circular wall 30 is formed integrally with, and serves as a closure for, one end of the annular wall 29. The other circular wall, that is, the wall 31, is formed separately from, and is removably secured to, the annular wall of the casing so as to permit of access to the interior of the casing. The hopper 27 is adapted to receive moulding sand in stream form from the mechanism 15 and serves to deliver or supply the sand into the casing 26 of the projector via an inlet opening in the central portion of the wall 31. The rotor 28 of the projector is disposed in the central portion of the casing 26 and is provided with a hub 36 and a blade 37. The hub of the rotor is mounted on and keyed to one end of the armature shaft 38 of the electric motor 13 so that the rotor is driven directly from the motor when the latter is supplied with current. The blade 37 is connected to and extends outwardly from the rotor and is adapted to rotate or swing around the inner periphery of the annular wall 29 of the projector casing. During operation or drive of the electric motor 13 the blade operates to form the sand within the casing into wads and to sling or project these wads downwards through the discharge member 32 and the tube 34 into the flask *f*. The blade is preferably rotated between 1200 and 1800 revolutions per minute. The sand which enters the casing from the hopper 27 falls into the lower portion of the casing. During operation of the electric motor the blade 37 picks up the sand in the lower portion of the casing and swings it around an arcuate liner 39 until the discharge member 32 is reached. During travel around the liner, the sand as the result of the action of centrifugal force and the shape of the blade, is formed or packed into a wad of closely or densely packed sand which when the blade reaches the member 32 is projected through the latter and thence down the tube 34 to the flask *f*. The liner 39 fits against the inner periphery of the annular wall 29 of the projector casing and extends from the low side of the discharge member around the wall 29 to the high side of the discharge member. The electric motor 13 is located adjacent to the circular wall 30 of the projector casing 26. It is coaxially positioned with respect to the projector casing and is fixedly secured in any suitable manner to said circular wall 30. A flat plate 40 is welded or otherwise fixedly secured to the top portion of the casing of the motor 13.

The mounting 14 whereby the assembly of projector and motor is suspended from the supporting structure 11 so that it is universally movable to a limited extent comprises a frame 41 and a yoke 42. The frame is rectangular and is disposed a small distance beneath the frame 19 of the supporting structure 11. It surrounds the assembly of projector and motor and consists of a pair of side members 43 and a pair of end members 44. The side members 43 are positioned in parallel relation with the side beams 19 of the frame 17 of the supporting structure and extend alongside of the assembly of projector and motor. They are preferably formed of pipes and are held in parallel and laterally spaced relation by way of the end members 44. The latter are yoke-shaped, as shown in Figure 9, and have upwardly facing semicircular seats 45 in the ends thereof. The ends of the side members 43 of the mounting frame fit within these seats and are fixedly secured to the ends of the yoke shaped end members 44 by means of U-bolts 46. The latter extend around the ends of the side members of the frame and project through the ends of the end members. The mounting frame 41 is suspended at the ends thereof from the rectangular frame 17 of the supporting structure 11 by way of a pair of base plates 47, hangers 48, and a pair of rubber blocks 49. The base plates 47 underlie the central or arched portions of the yoke-shaped end members 44 of the frame 41 and are fixedly secured by bolts 50 to the lower ends of the hangers 48. The hangers are four in number and are arranged in pairs at the ends of the mounting frame respectively. The hangers of one pair are fixedly secured to and depend from the bottom flanges of the cross-beams 20 and 21 and are positioned on opposite sides of, that is, in straddled relation with respect to, one of the yoke-shaped end members 44. The hangers of the other pair are associated with the other end of the mounting frame 41 and are fixedly secured to and depend from the bottom flanges of the cross-beams 22 and 23 of the rectangular frame 17 of the supporting structure 11. They straddle and project downwardly and outwardly on opposite sides of the end member at said other end of the mounting frame and are preferably formed of cast metal. The base plates 47 are H-shaped and the bolts 50 extend upwardly through the corner portions thereof and into the bottom parts of the hangers 48. The rubber blocks 49 are disposed between the base plates and the central or arched portions of the yoke shaped end members 44 of the mounting frame 41 and form pivotal connections whereby the frame together with the assembly of projector and motor is permitted to rock laterally. They are located in substantially the same plane as the common axis of the projector and motor and have convex top and bottom faces. By locating the blocks 49 in the aforementioned plane rocking of the frame is extremely easy because the assembly is in balanced relation as far as the block formed pivotal connections are concerned. By having the top and bottom faces of the blocks convex the side portions of the blocks compress readily during rocking of the frame and assembly. Due to the fact that the blocks are formed of rubber any vibration of the mounting frame 41 resulting from the operation of the projector is absorbed and hence is not transmitted to the supporting structure 11. Another advantage in forming the blocks of rubber is that the frame when released after tilting thereof tends to return to its normal horizontal position. The lower faces of the blocks 49 rest directly on the top faces of the base plates 47 and, as shown in Figure 10, the plates have upstanding bosses 51 which project upwardly into sockets 52 in the bottom portions of the blocks and prevent lateral or sidewise displacement of the blocks with respect to the base plates. The upper portions of the rubber blocks 49 bear against a pair of plates 53 and are confined or held against lateral displacement with respect to the plates by means of depending flanges 54. The latter, as shown in Figure 9, are formed integrally with the plates 53 and lap the sides of the blocks. The plates 53 engage the bottom faces of the central or arched portions of the yoke-shaped end members 44 of the mounting frame 41 and have depending bosses 55 which fit within sockets 56 in the upper portions of the blocks 49. The depending flanges 54 of the blades are spaced inwardly from a plurality of depending lugs 57 on the central portions of the end members 44 and form abutments or seats for the inner ends of a set of set screws 58. The set screws, as shown in Figure 9, extend transversely through the lugs 57 into abutment with the flanges 54 and serve to hold the plates in clamped relation with respect to the end members 44 of the mounting frame. By adjusting the set screws the frame 41 and the assembly may be shifted laterally with respect to the rubber blocks 49 into a balanced position wherein the common axis of the projector and motor is disposed in the same plane as the pivotal connections which are formed by the blocks. The blocks 49 are disposed at such an elevation or height that the axis of the pivotal connections which they form passes through the center of mass of the assembly. In order to absorb shock and prevent rebound a pair of rubber cylinders 59 is provided. These cylinders constitute snubbers for the block formed pivotal connections at the ends of the frame and are located beneath the central portions of the base plates 47. Bolts 60 serve to connect the snubber-forming cylinders 59 in their operative position. These bolts depend from the central portions of the yoke-shaped end members 44 of the mounting frame 41 and have nut supported washers 61 at their lower end on which the lower ends of the cylinders rest. The upper portions of the bolts extend through slots 62 in the plates 53 and slots 63 in the rubber blocks 49. The lower ends of the bolts extend through comparatively large holes 64 in the central portions of the base plates and through holes or bores in the cylinders. The slots 62 and 63 extend transversely of the plates 53 and the rubber blocks 49 and permit of lateral adjustment of the frame with respect to the blocks.

The yoke 42 which together with the frame 41 constitutes the mounting whereby the assembly of projector and motor is suspended from the supporting structure 11 for limited universal movement serves to secure the assembly in connected relation with the frame 41 and is disposed substantially midway between the end members 44. It is in the form of a metal casting and has its ends pivotally connected to the side members 43 of the frame 41 by way of rubber blocks 65 and a pair of bracket plates 66. The central portion of the yoke is flat on the bottom thereof and overlies and is welded or otherwise fixedly secured to the plate 40 on the top portion of the casing of the motor 13. The ends of the yoke are located opposite to and spaced equidistantly from the sides of the casing of the motor 13 and are flat on the bottom. The bracket plates 66 which together with the rubber blocks 65 constitute the pivotal connections between the yoke and the side members of the frame whereby the assembly of projector and motor is permitted to tilt up and down have substantially semicircular seats 67 on the bottom portions thereof in which the side members fit, as shown in Figure 6. U-bolts 68 extend around the side members 43 and through the bracket plates and serve to hold the bracket plates and the side members in fixed relation. The rubber blocks 65 are similar in character to the blocks 49 at the ends of the mounting frame 41. They have convex top and bottom faces and are so positioned with respect to the assembly that the common axis of the pivotal connections which are formed by the blocks and the bracket plates extends substantially through the center of mass of the assembly and extends at right angles to the axis of the projector and motor. The bottom faces of the blocks 65 fit against the top faces of the bracket plates 66 and the latter have upwardly extending bosses 69 which fit within sockets 70 in the bottom portions of the blocks 65 and prevent lateral displacement of the blocks with respect to the bracket plates. The upper portions of the blocks engage and support a pair of plates 71 and are confined against sidewise displacement with respect to such plates by means of depending flanges 72 along the side margins of the plates. The plates, as shown in Figure 6, underlie the ends of the yoke 42 and have depending bosses 73 which fit within sockets 74 within the upper portions of the rubber blocks 65 and assist the flanges 72 in holding the blocks against lateral displacement with respect to the plates. By reason of the fact that the blocks 65 are formed of rubber and the top and bottom faces thereof are convex the side portions compress readily and hence the blocks permit of easy or ready vertical tilting of the assembly.

The plates 71 fit between depending lugs 75 on the ends of the yoke 42 and are held against sidewise displacement with respect to the yoke by means of set screws 76 which extend through the lugs and abut against the flanges 72. By adjusting these set screws the yoke and assembly of projector and motor may be adjusted laterally with respect to the rubber blocks 65 so as to bring the center of mass of the assembly into substantial alignment with the block formed pivotal connections at the sides of the frame 41 for balancing purposes. In order to prevent rebound and also absorb shock during operation of the projector 12 a pair of rubber cylinders 77 is provided. These cylinders are disposed over and bear against the outer extremities of the yoke 42. They serve as snubbers and are secured in place by means of a pair of bolts 78. The latter are fixed to and extend upwardly from the outer portions of the bracket plates 66. The upper portions of the bolts extend through transverse slots 79 in the outer extremities of the yoke and pass through bores 80 in the rubber cylinders 77. Enlarged heads 81 are formed on the upper ends of the bolts and these bear against the upper ends of the rubber cylinders 77 and hold the cylinders under the desired or proper amount of compression. The rubber blocks 65 constitute pivotal connections between the yoke 42 and the side members of the frame whereby the assembly of projector and motor is permitted to tilt vertically about an axis which substantially passes through or intersects the center of mass of the assembly and extends at right angles to the motor, and the plates 71 and set screws 76 consttiute means for shifting the frame and assembly longitudinally of said pivotal connections in order to effect proper balancing of the assembly. The rubber blocks 49 constitute a pivotal connection between the ends of the frame 41 and the hangers 48 for permitting the assembly of projector and motor to rock back and forth on an axis intersecting and extending at right angles to the axis of the pivotal connections formed by the blocks 65. The plates 53 and the set screws 58 constitute means for adjusting the assembly and frame laterally with respect to the pivotal connections between the end members 44 of the frame and the hangers 48 for balancing purposes. In view of the specific character and construction of the mounting 14 consisting of the frame 41 and the yoke 42 the assembly of projector and motor is efficiently supported and may be moved universally to a limited extent with great facility. The rubber blocks 49 are disposed in the same plane as the rubber blocks 65. As a result of this the axis of the pivotal connections which are formed by the blocks 49 intersects the axis of the pivotal connections which are formed by the blocks 65 at substantially the center of mass of the assembly of projector and frame.

The mechanism 15 for supplying sand to the hopper 27 comprises a sand reservoir 82 and a delivery chute 83. The reservoir is positioned over the platform forming frame 17 of the supporting structure 11 and consists of a fixed side wall 84 and a rotatable bottom 85. The side wall is cylindrical. It is supported by an angle bar frame work over the frame 19 and embodies a discharge opening 86 in the bottom portion thereof. A deflector 87 is disposed within the lower portion of the side wall of the reservoir and operates during drive or rotation of the reservoir bottom 85 to deflect the sand in the reservoir out through the discharge opening 86 into the upper end of the chute 83. This chute, as shown in Figures 1 and 2, is mounted on the central portion of the frame 19 of the supporting structure and is arranged so that the lower or discharge end thereof overlies the hopper 27 of the projector. Drive of the reservoir bottom for sand feeding or supplying purposes is effected by means of an electric motor 88, a speed reducing unit 89, a pinion 90, and a ring gear 91. The electric motor 88 is mounted over the crossbeam 24 of the frame 19 of the supporting structure and is connected by a coupling 92 to the speed reducing unit 89. The driven shaft of this unit carries the pinion 90 which, as shown in Figure 1, meshes with and serves to drive the ring gear 91. The latter is fixed to the reservoir bottom 85 and is supported by a suitable bearing structure 93. When the motor 88 is operated as a result of the supply of current thereto the reservoir bottom 85 as the result of the driving connection between it and the motor is rotated and the sand thereon, as hereinbefore pointed out, is deflected by the deflector 87 through the discharge opening 86 into the chute 83. The latter as a result of its location and position delivers the sand in stream form into the hopper 27 from which it passes into the projector casing as hereinbefore described.

The mechanism 16 for automatically moving the assembly of projector and motor round and round so that the projector operates to fill with wads of sand all portions of the subjacent flask f is disposed over the assembly and comprises an upstanding rod 94, rotatable disk 95, a speed reducing unit 96, and an electric motor 97. The rod 94 is fixed at its lower end to a plate 98 which is welded or otherwise suitably secured to the upper part of the central portion of the yoke 42. The upper end of the rod 94 is connected by way of a swivel joint 99 to a plate 100 which extends radially with respect to, and depends from, the disk 95. When the disk 95 is driven the plate 100 is swung in a circular course and causes the upper end of the rod to travel in a like course. As the result of such movement or travel of the upper end of the rod the assembly is caused to move in such manner that the discharge chute of the directing tube travels round and round over the flask f and delivers sand into all portions of the latter. The joint 99 is connected to the plate by a bolt and arcuate slot connection so that it may be moved toward and away from the center of the disk when it is desired to adjust the course of movement of the assembly. The disk 95 is driven from the driven shaft of the speed reducing unit 96. The latter, as shown in Figures 1 and 2, is mounted on a platform 101 on the frame 19 of the supporting structure. The drive shaft of the speed reducing unit 96 is driven from the electric motor 97 by means of a belt and pulley connection 102.

When the electric motors 13, 88 and 97 are in operation the apparatus operates in the following manner: As the result of drive of the reservoir bottom 87 sand in the reservoir is fed in stream form through the chute 83 into the hopper 27. From this hopper the sand enters the casing 26 of the projector and is there formed into wads by the blade equipped rotor. When the wads pass the discharge member 32 they are flung downwards by the action of the blade through the directing tube 34 and enter the flask f. While the sand is being formed into wads within the projector casing the mechanism 16 operates to move the assembly of projector and motor in a circular course over the flask. This movement of the assembly results in the projector discharging its wads of sand into all portions of the flask f.

The herein described apparatus is exceptionally efficient in operation due to the specific character and design of the mounting 14 which permits of limited universal movement of the assembly and due to the manner in which it supports the assembly permits of movement thereof with a minimum amount of effort or power. If it is desired manually to move the assembly of projector and motor over the flask it is only necessary to disconnect the swivel joint 99 from the plate 100 or disconnect the rod 94 from the yoke 42.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In an apparatus of the character described, the combination of a supporting structure, an assembly consisting of a rotary projector and a projector driving motor at one side of the projector and adapted to project moulding material downwards into a subjacent flask, and a mounting for supporting the assembly for movement over the flask, comprising a frame extending around the assembly, a yoke having the central portion thereof overlying and fixed to the assembly and its ends connected pivotally to opposed portions of the frame, and aligned pivotal connections between other opposed portions of the frame and the supporting structure and disposed at right angles to the yoke.

2. In an apparatus of the character described, the combination of a supporting structure, a rotary projector of the casing and blade equipped rotor type adapted to fill a subjacent flask with mould forming material, an electric motor connected to one side of, and positioned in substantially coaxial relation with, the casing of the projector and having the armature shaft thereof connected to drive the projector rotor, and a mounting for supporting the assembly of projector and motor so that it can be moved universally to a limited extent in order to permit the projector to direct the wads into different portions of the flask, comprising a rectangular frame extending around the assembly and arranged so that the side members thereof extend horizontally, a yoke having the central portion thereof overlying and fixed to the casing of the motor and its ends connected pivotally to the side members of the frame, and aligned pivotal connections between the end members of the frame and the supporting structure.

3. In an apparatus of the character described, the combination of a supporting structure, a rotary projector of the casing and blade equipped rotor type adapted to fill a subjacent flask with mould forming material, an electric motor connected to one side of, and positioned in substantially coaxial relation with, the casing of the projector and having the armature shaft thereof connected to drive the projector rotor, and a mounting for supporting the assembly of projector and motor so that it can be moved universally to a limited extent in order to permit the projector to direct the wads into different portions of the flask, comprising a rectangular frame extending around the assembly and having the side members thereof arranged so that they extend horizontally, a yoke having the central portion thereof overlying and fixed to the casing of the motor and having the ends thereof overlying the central portion of the side members of the frame, blocks of resilient material between the ends of the yoke and the underlying portions of the frame side members forming pivotal connections between the yoke and said side members of the frame, and aligned pivotal connections between the end members of the frame and the supporting structure.

4. In an apparatus of the character described, the combination of a supporting structure, a rotary projector of the casing and blade equipped rotor type adapted to fill a subjacent flask with mould forming material, an electric motor connected to one side of, and positioned in substantially coaxial relation with, the casing of the projector and having the armature shaft thereof connected to drive the projector rotor, and a mounting for supporting the assembly of projector and motor so that it can be moved universally to a limited extent in order to permit the projector to direct the wads into different portions of the flask, comprising a rectangular frame extending around the assembly and having the side members thereof arranged so that they extend horizontally, a yoke having the central portion thereof overlying and fixed to the casing of the motor and having the ends thereof overlying the central portions of the side members of the frame, blocks of resilient material between the ends of the yokes and the underlying portions of the frame side members forming pivotal connections between the yoke and said side members of the frame and a pair of resilient blocks supported by the structure and underlying the central portions of the end members of the frame respectively and forming pivotal connections between the frame ends and the structure.

5. In an apparatus of the character described, the combination of a supporting structure, an assembly consisting of a rotary projector and a projector driving motor at one side of the projector and adapted to project mould forming material downwards into a subjacent flask, a pair of laterally spaced side members extending alongside of the assembly and carried by the supporting structure, and a yoke having the central portion thereof overlying and fixed to the assembly and the end portions thereof connected by pivotal connections to the side members so that the assembly may be tilted up and down in order to cause the projector to project the material into different portions of the flask.

6. In an apparatus of the character described, the combination of a supporting structure, an assembly of rotary projector and projector driving motor for projecting mould forming material downwards into a subjacent flask, a pair of laterally spaced side members extending alongside of the assembly and carried by the supporting structure, a yoke having the central portion thereof overlying and fixed to the assembly and the end portions thereof overlying the side members, and blocks of resilient material between the end portions of the yoke and the underlying portions of the side members forming pivotal connections between the yoke and said side members whereby the assembly may be tilted up and down in order to cause the projector to project the material into different portions of the flask.

7. In an apparatus of the character described, the combination of a supporting structure, a rotary projector of the casing and blade-equipped rotor type adapted to fill a subjacent flask with mould forming material, an electric motor connected to one side of, and positioned in substantially coaxial relation with, the casing of the projector and having the armature shaft thereof connected to drive the projector rotor, a pair of laterally spaced side members extending alongside of the assembly of projector and motor and carried by the supporting structure, a yoke having the central portion thereof overlying and fixed to the motor and the end portions thereof overlying the side members, blocks of resilient material between said end portions of the yoke and the underlying portions of the side members forming pivotal connections whereby the assembly is permitted to tilt up and down in order to cause the projector to project the material into different portions of the flask, and means for adjusting the yoke and assembly laterally with respect to the blocks for balancing purposes.

8. In an apparatus of the character described, the combination of a supporting structure, a rotary projector of the casing and blade-equipped rotor type adapted to fill a subjacent flask with mould forming material, an electric motor connected to one side of, and positioned in substantially coaxial relation with, the casing of the projector and having the armature shaft thereof connected to drive the projector rotor, a pair of laterally spaced side members extending alongside of the assembly of projector and motor and carried by the supporting structure, a yoke having the central portion thereof overlying and fixed to the motor and the end portions thereof overlying the side members, blocks of resilient material between said end portions of the yoke and the underlying portions of the side members forming pivotal connections whereby the assembly is permitted to tilt up and down in order to cause the projector to project the material into different portions of the flask, and snubbers associated with the end portions of the yoke and serving to hold said end portions and the blocks and underlying portions of the side members in clamped relation.

9. In an apparatus of the character described, the combination of a supporting structure, an assembly of rotary projector and projector driving motor adapted to project mould forming material downwards into a subjacent flask and normally to extend substantially horizontally, a mounting for supporting the assembly for movement over the flask, comprising a rectangular frame extending around and longitudinally of the assembly and arranged so that the side members thereof extend horizontally, aligned pivotal connections extending between the assembly and the side members of the frame for permitting said assembly to tilt up and down, and aligned pivotal connections extending between the end members of the frame and the supporting structure and at substantially right angles to said first mentioned connections and adapted to permit said assembly to rock sidewise, and means for adjusting the assembly lengthwise of the frame and relatively to said first mentioned connections for assembly balancing purposes.

10. In an apparatus of the character described, the combination of a supporting structure, an assembly of rotary projector and projector driving motor adapted to project mould forming material downwards into a subjacent flask and normally to extend substantially horizontally, a mounting for supporting the assembly for movement over the flask, comprising a rectangular frame extending around the assembly and arranged so that the side members thereof extend horizontally and also lengthwise of said assembly, aligned pivotal connections between the assembly and the side members of the frame for permitting the assembly to tilt up and down, and aligned pivotal connections extending between the central portions of the end members of the frame and the supporting structure and adapted to permit said assembly to rock sidewise and means for adjusting the frame laterally with respect to the second mentioned pivotal connections for assembly balancing purposes.

WALTER E. NAYLOR.